Feb. 8, 1938. J. J. BOSSHARD 2,107,323
STORE FRONT CONSTRUCTION
Filed Aug. 17, 1936
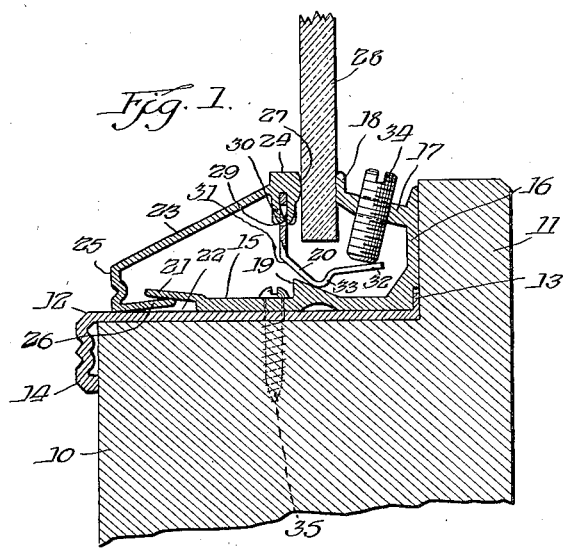
Inventor:
John J. Bosshard
By Wilkinson Huxley Byron Knight
Attys.

Patented Feb. 8, 1938

2,107,323

UNITED STATES PATENT OFFICE 2,107,323

STORE FRONT CONSTRUCTION

John J. Bosshard, Chicago, Ill., assignor to Brasco Manufacturing Company, Harvey, Ill., a corporation of Illinois Application August 17, 1936, Serial No. 96,371

5 Claims. (Cl. 20—56.4)

My invention relates to store front construction, and has particular reference to a construction in which a resilient mounting is provided for glass panes and the like, and which provides for a certain amount of flexibility and resiliency for increasing wind strain and other shocks to which a glass may be subjected, thereby providing a structure in which breakage of the glass is less liable to occur and which when the strain is removed allows the glass and mounting to assume their original position.

Another and further object of my invention is the provision of a store front construction in which glass of varying thicknesses may be mounted so that it is not necessary to provide special forms of mounting for varying thicknesses of glass. In my improved mounting, glass varying in thickness as much as a quarter of an inch may be used and mounted successfully without altering the parts or arranging them in a different manner whatsoever.

Another and further object of my invention is the provision of a store front construction in which a structure having a comparatively wide base is provided, by means of which the weight of the store front is supported inward from the edge of the frame or ornamental construction a sufficient distance so that the weight of the glass pane is adequately supported and undue strain is not placed upon the structure, as is the case where heavy plate glass store fronts are placed adjacent the edge of the frame supporting structure or the edge of various forms of ornamental structures now commonly employed in store front construction.

Another and further object of my invention is the provision of a store front construction in which a glass engaging member of rounded form is employed and in which the point of support is adequate to hold the glass in proper position and yet allow the glass to flex or bend slightly under the influence of severe wind pressure or the like without danger of breakage or chipping off of the edge of the glass.

Another and further object of my invention is the provision of a store front construction in which a two-point support is provided at the outer side thereof for the outer glass pane engaging member, which supporting points are so provided with respect to the contacting angular positions of the balance of the structure that these points function properly regardless of the thickness of the store front construction or the angle of the outer engaging member with respect to the base member of the store front construction.

These and other objects will be more fully and better understood by reference to the accompanying sheet of drawings, in which—

Figure 1 is a cross sectional view through a section of a store front construction of my invention;

Figure 2 is a perspective view of a section of the outer glass engaging member; and Figure 3 is a perspective view showing the inner glass engaging member, and the sill, in position to be applied to a window opening.

Referring now specifically to the drawing, and in which like reference characters refer to like parts throughout, a window frame 10 is shown of usual form, having a back portion 11 which extends upwardly from the base portion. A casing member 12 is provided which is fitted against the base portion of the frame 10 and has a flange 13 at the rear side thereof angularly disposed with respect to the body of the member 12 and which is fitted against the back portion 11 of the frame 10. A flange 14 is integrally formed with the casing member 12, which extends over the forward edge of the sill for protective and ornamental purposes, and may be in any form desired. An inner glass pane engaging member is provided which consists of a base portion 15, a vertical wall portion 16, a web section 17, and a channel or glass engaging portion 18, all integrally formed, with the web section 17 extending from the upper edge of the section 16 outwardly with the glass engaging portion 18 extending along the free edge thereof. The base 15 and rear wall portion 16 are in right angled relation with each other and are adapted to fit against the casing member 12 and the back wall portion 11 of the frame 10. A channel is formed on the outside corner of the juncture of the base portion 15 and wall portion 16, into which the flange 13 of the casing member 12 is fitted, thereby providing a substantially smooth outer contour for the casing member 12 and the inner glass pane engaging member which is interfitted into the window frame 10.

Extending longitudinally of the portion 15 is a projecting portion 19, the upper surface of which is inclined to form a bearing surface for a spring member 20 hereinafter specifically referred to and described. A flange portion 21 is provided along the outer edge of the base 15 of the inner glass pane engaging member, this portion being projected upwardly in an angular position and free from the casing member 12 whereby a channel 22 is formed. This channel, by reason of the angular position of the flange portion 21, is narrower at its inner portion than it is at the outer portion.

An outer glass pane engaging member is provided which consists of a web portion 23, a glass pane engaging rail section 24 along the inner edge of the web portion 23, a vertical wall 25, and an inwardly extending flange 26 which is angularly disposed with respect to the casing 12 in its normal position. This flange portion 26 is at substantially right angles to the vertical wall portion 25 and is adapted to be fitted in full face to face engaging position with the base of the casing member 12 when the flange section 19 on the inner glass engaging member and the rail section 24 on the outer glass engaging member are in substantial engagement with each other or spaced apart only a very short distance, say $\tfrac{1}{16}$ of an inch. With the moving outward of the outer glass pane engaging member to accommodate a glass pane of varying thickness, the outer glass pane engaging member is therefore slightly inclined at an angular position, bringing the inner edge of the portion 26 of the outer glass pane engaging member against the under side of the flange 21 of the inner glass engaging member and at the same time the slightly angular position of the outer glass engaging member brings the corner between the vertical wall section 25 and the section 26 into firm engagement with the casing member 12 so that in effect a two-point contact or engagement is provided for the outer glass pane engaging member at its outer corner thereof and along the inner edge of the portion 26.

The glass pan engaging face 27 of the rail 24 is slightly rounded so that regardless of the angular position of the outer glass pane engaging member a firm, wide contact is maintained with the glass pane 28 which is inserted between the face 27 and the face of the flange member 18 on the inner glass pane engaging member. The rail portion 24 also has a slot 29 extending longitudinally thereof, within which the end of a spring member 20 is mounted, with suitable holes being provided in the end of the spring member 20 through which the metal of the rail section 24 is extruded at 31, 31, thereby holding the spring firmly in position in fixed spaced relation with other springs in the outer glass pane holding member when these sections are made at the factory. The spring 20 has an angularly disposed portion 32 intermediate its ends which is adapted to contact with the inclined surface of the portion 19, with an upturned inwardly extending free end 33, with which a screw 34, mounted in the web 17, is adapted to engage. When the screw 34 is tightened the outer glass pane engaging member is moved inward initially until firm engagement is established against the side of the glass pane 11 and also between the inner edge of the portion 26 and the under side of the flange 21, and also causes a firm engagement of the corner of the outer glass pane member upon the casing 12. Thereafter a further tightening of the screw 34 places the spring under tension, which in effect places the outer glass pane engaging member under tension as well as the spring holding the member in assembled relation and the glass pane 28 in proper position in the fixture.

Screws 35 are provided which extend through holes 36, 36 in the casing member 12 and in the base 15 of the inner glass pane engaging member, these holes 36 being normally placed in registering position with each other so that the inner glass pane engaging member is firmly secured to the window frame 10.

In operation it will be understood that the casing member 12 and inner glass pane engaging member are placed in position in the frame 10, which has been prepared in form to receive them, and are secured to the window casing by means of the screws 35. In setting the glass, the outer pane engaging strip is placed in position, which has been preformed, and which also has the spring member 20 spotted in proper position so that when the member is placed in position the free ends of the spring member will come under the screws 34. After the glass pane is in position, the outer glass pane engaging member is tightened up by means of the screw 34 and in its initial movement the outer glass pane engaging member is drawn inward until the rail section is fairly taut against the glass pane. Thereafter the screw can be tightened, which puts the spring 20 under tension and in effect places the outer glass pane member under tension so that the whole construction is under tension to a certain extent. When it is desired to remove the glass, of course, the screws 34 can be loosened and the outer glass pane engaging member removed, allowing the glass pane 28 to be removed and replaced if desired.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A store front construction comprising an inner glass pane engaging member having a base, a wall and an outwardly extending web portion, the base portion having an inclined portion on its inner side and a flange portion along its outer edge, a screw mounted in said web portion, an outer glass pane engaging member having a web portion having an inner rounded contact portion for the glass pane, and an inwardly extending flange portion adapted to engage under the flange portion of the base of the inner glass pane engaging member, and a holding member mounted in the outer glass pane engaging member adapted to coact with the said screw and to contact with the inclined portion of said base member.

2. A store front construction comprising an inner glass pane engaging member having a base, a wall and an outwardly extending web portion, the base portion having an inclined portion on its inner side and a flange portion along its outer edge, a screw mounted in said web portion, an outer glass pane engaging member having a web portion and an inwardly extending flange portion adapted to engage under the flange portion of the base of the inner glass pane engaging member, and a resilient holding member mounted in the outer glass pane engaging member adapted to coact with the said screw and to contact with the inclined portion of said base member.

3. A store front construction comprising an inner glass pane engaging member having a base, a wall and an outwardly extending web portion, the base portion having an inclined portion on its inner side and a flange portion along its outer edge, a screw mounted in said web portion, an outer glass pane engaging member having a web portion having a rail portion on its inner edge with a rounded glass pane engaging edge, and an inwardly extending flange portion adapted to engage under the flange portion of the base of the inner glass pane engaging member, and a spring member mounted in said rail portion having its free end in position to be engaged by said screw and having an intermediate portion adapted to engage the inclined portion of said base.

4. A store front construction comprising, in combination, an inner pane engaging member having a base, wall and web portion, with a flange along the web portion adapted to engage the glass pane, a screw in said web portion, the base having an angularly disposed flange portion out of contact with the sill of the window casing whereby a channel is formed along the outer edge of the base member and also having an inclined portion on the base thereof, an outer glass pane engaging member having a flange portion extending inwardly, the edge of which is adapted to engage the flange portion of the inner glass pane engaging member, a spring having one end mounted in the outer glass pane engaging member adjacent the edge thereof with an intermediate portion in engagement with the inclined portion of said inner glass pane engaging member and its free end adapted to be engaged by the said screw.

5. A store front construction comprising, in combination, an inner pane engaging member having a base, wall and web portion with a flange along the web portion adapted to engage the glass pane, a screw in said web portion, the base having an angularly disposed flange portion out of contact with the sill of the window casing whereby a channel is formed along the outer edge of the base member and also having an inclined portion on the base thereof, an outer glass pane engaging member having a flange portion extending inwardly, with a pane engaging rail along the inner side thereof having a rounded surface and a channel on the under side thereof extending longitudinally thereof, a spring having one end mounted in said channel and its free end extending under and adapted to be engaged by the said screw and having an angularly extending intermediate portion adapted to be engaged by the inclined portion on the base of said inner glass pane engaging member.

JOHN J. BOSSHARD.